E. TIMMERHOFF.
WHEEL HUB CAP.
APPLICATION FILED FEB. 3, 1917.

1,234,968.

Patented July 31, 1917.

Ernest Timmerhoff,
INVENTOR.
By George Ottseh
ATTORNEY.

UNITED STATES PATENT OFFICE.

ERNEST TIMMERHOFF, OF ELKHART, INDIANA, ASSIGNOR OF ONE-HALF TO CHARLES E. TEED, OF ELKHART, INDIANA.

WHEEL-HUB CAP.

1,234,968.                    Specification of Letters Patent.    Patented July 31, 1917.

Application filed February 3, 1917. Serial No. 146,465.

*To all whom it may concern:*

Be it known that I, ERNEST TIMMERHOFF, a citizen of the United States, residing at Elkhart, in the county of Elkhart and State of Indiana, have invented certain new and useful Improvements in Wheel-Hub Caps, of which the following is a specification.

This invention relates to an improvement in hub caps for automobile wheels, particularly of that type designed for convenient removal to provide access to the parts, while at the same time forming a more or less ornamental finish to the wheel.

Hub caps of this type have heretofore generally been secured by a threaded point band and coöperating threaded section on the cap, or by operating bolts set through the cap and threaded into the hub. In either such construction, the time and labor incident to the application or removal of the hub cap, as well as the cost of manufacture of the cap and its coöperating parts, prove a distinct disadvantage.

It is the object of the present invention, therefore, to provide a hub cap which is secured in place directly through means necessarily forming a portion of the wheel structure, together with such specific construction of the cap proper as will permit the most convenient and expeditious application or removal of the cap when necessary.

Considered in its specific application, the improved hub cap, which may be of any ornamental form desired, has its engaging edge recessed at determinate points, and the ordinary bolts for securing the hub plates together to bind the wheel parts, are utilized as the securing means for the cap. Certain of these bolts are reversed so that the removable nuts are on the outer side of the wheel, and the diameter of the engaging edge of the hub cap is practically coextensive with the maximum diametric distance between the said securing bolts. The recesses in the securing edge of cap are coextensive with the normal projections of the securing nuts on the cap, so that with the nuts slightly loosened the cap may be applied or removed by registering the recesses in the edges of the cap with the nuts and moving the cap inwardly into contact with the adjacent hub plate. The cap is then turned so that the nonrecessed portion of the edge is beneath the nuts, whereupon the nuts are tightened, securing the cap in place.

The invention, in a simple form, is illustrated in the accompanying drawings, in which:—

Figure 1:
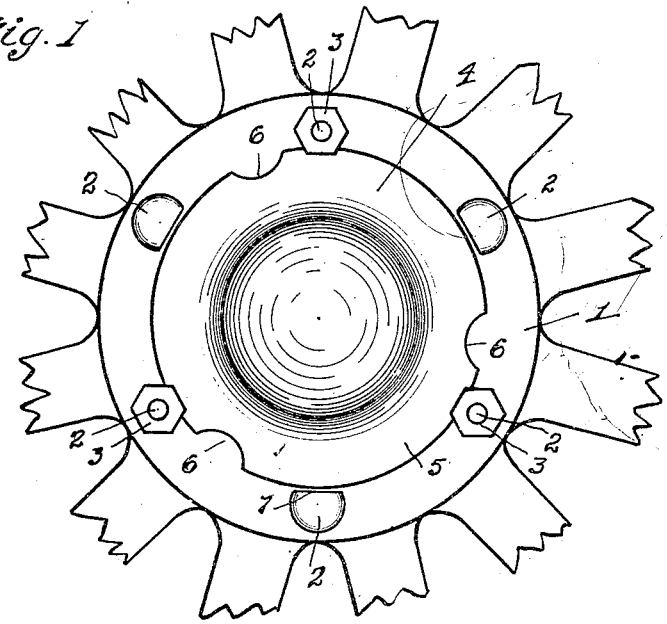
Figure 1 is a broken front elevation of a wheel showing the improved cap in place.
Figure 2:
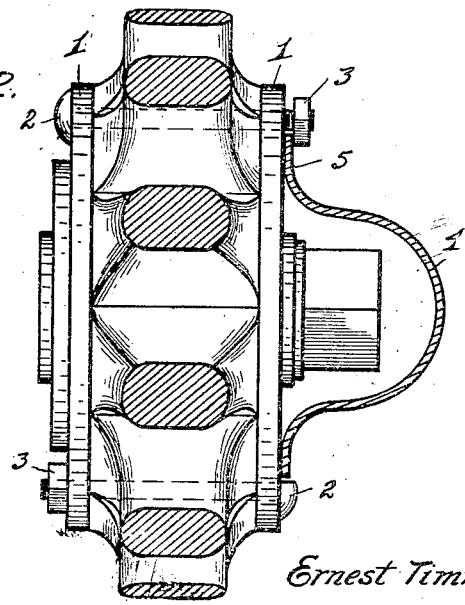
Fig. 2 is an edge elevation of the same, with the cap in section.

The accompanying drawings illustrate a conventional type of automobile wheel in which the hub structure, and radiating spokes are secured in wheel forming relation by opposed hub plates, 1, secured in place by bolts 2, passed transversely through the spoke tenons, and engaged by nuts 3.

As ordinarily arranged, the heads of the bolts 2 are on the outer side of the wheel, both to provide for convenient tightening of the nuts from the inner side when desired, and to avoid obstruction on the outer side of the wheel. For the purposes of the present invention, however, certain of the bolts will be reversed, as for example every other such bolt, so that the head end thereof is on the inner side of the wheel and the nut receiving end on the outer side.

The improved hub cap 4, which may be of any desired ornamental formation, is formed or provided with an edge flange 5, adapted to bear against the outer hub plate 1. The edge flange 5 of the cap is of a maximum diameter approximately equal to the diameter of the circle included just within the shanks of the reversed bolts, so that in the absence of the nuts 3 on said bolts the edge flange would seat within the bolts. The edge flange is cut, or recessed, at 6, the recesses being disposed with particular relation to the reverse bolts, in that in a determinate position of the cap the recesses will simultaneously register with said bolts. The recesses are of sufficient size to receive the nuts 3 when applied to the bolts, that is with the nuts applied, the cap, with the recesses in register with the nuts may be readily removed or applied axially of the wheel without interferences.

In applying the cap, the recesses of the edge flange are arranged to register with the nuts, after slightly loosening the latter on the bolts. The cap is then moved inwardly toward the adjacent hub plate until the edge flange is disposed in a plane between the said hub plate and loosened nuts, whereupon the cap is turned on the hub plate as a base, until an unbroken edge of the flange rides beneath each of the loosened nuts. When the recesses have thus been turned beyond the nuts the latter are tightened, thus securing the cap in place.

The removal operation of the cap is obvious, as by loosening the nuts, and turning the cap until the recesses register with such nuts, the cap may be freely removed. In the event the heads of the normally placed or nonreversed bolts of the wheel interfere with the application of the cap, such heads may be reduced on one side as shown at 7.

The improvement provides a hub cap which is secure when applied, which may be readily and quickly applied or removed, which requires no additional parts, other than are employed in the formation of the wheel, for holding the cap in place, and which materially simplifies and reduces the cost of manufacture of the cap and eliminates entirely the provision of means on the wheel for the specific holding of the cap.

What is claimed as new is:

1. A wheel hub cap formed with edge recesses, a wheel, bolts secured to the wheel, and cap securing nuts coöperating with the bolts and adapted to overlie the marginal edge of the cap beyond the recesses, the recesses being of a size to clear the nuts when in register therewith.

2. A wheel hub having hub securing bolts arranged with the nut receiving ends on the outer side of the wheel, a cap for the hub having an edge flange, and nuts coöperating with said bolts and adapted to overlie and engage the hub flange, said flange being formed with recesses to register with the nuts to free the cap without removing the nuts from the bolts.

In testimony whereof I affix my signature in presence of two witnesses.

ERNEST TIMMERHOFF

Witnesses:
CARLTON T. OLDS,
CHARLES E. FEED.